No. 882,815. PATENTED MAR. 24, 1908.
J. DANISCHEVSKI.
DEVICE FOR AUTOMATIC KINDLING OF INCANDESCENT LAMPS.
APPLICATION FILED SEPT. 14, 1906.

2 SHEETS—SHEET 1.

Witnesses:
Jas. E. Hutchinson
B. Sommers

Inventor
Joseph Danischevski
By Henry Orth Jr. Attorney

No. 882,815. PATENTED MAR. 24, 1908.
J. DANISCHEVSKI.
DEVICE FOR AUTOMATIC KINDLING OF INCANDESCENT LAMPS.
APPLICATION FILED SEPT. 14, 1906.

2 SHEETS—SHEET 2.

Witnesses:
Jas. E. Hutchinson
C. V. Sommers

Inventor
Joseph Danischevski
By Henry Orth Jr. Attorney

UNITED STATES PATENT OFFICE.

JOSEPH DANISCHEVSKI, OF ST. PETERSBURG, RUSSIA.

DEVICE FOR AUTOMATIC KINDLING OF INCANDESCENT LAMPS.

No. 882,815.   Specification of Letters Patent.   Patented March 24, 1908.

Application filed September 14, 1906. Serial No. 334,676.

*To all whom it may concern:*

Be it known that I, JOSEPH DANISCHEVSKI, a subject of the Emperor of Russia, and a resident of St. Petersburg, Russia, 14 Gagarinskaia street, have invented certain new and useful Improvements in Devices for Automatic Kindling of Incandescent Lamps, of which the following is a specification.

The construction of the proposed device for the automatic kindling of incandescent lamps (which may be called hydrostatic), is based on the fact that a certain time is required to fill a chamber with liquid, which flows through a thin tube or opening, which time may be determined exactly if the capacity of the chamber, the size of opening and the pressure with which the liquid flows are known. When, after the elapse of a certain length of time, the chamber becomes filled and the liquid will flow through a tube open at the upper end of the chamber, to the place where it is to be used.

Making use of such a method for feeding incandescent lamps with liquid combustible, the flow of the latter to the vaporizing tube may be regulated in such a way, that when kindling the lamp, the liquid should commence to enter the vaporizer only after the latter has become sufficiently heated by the flame of the alcohol contained in the cup under the vaporizer.

Figure 1:
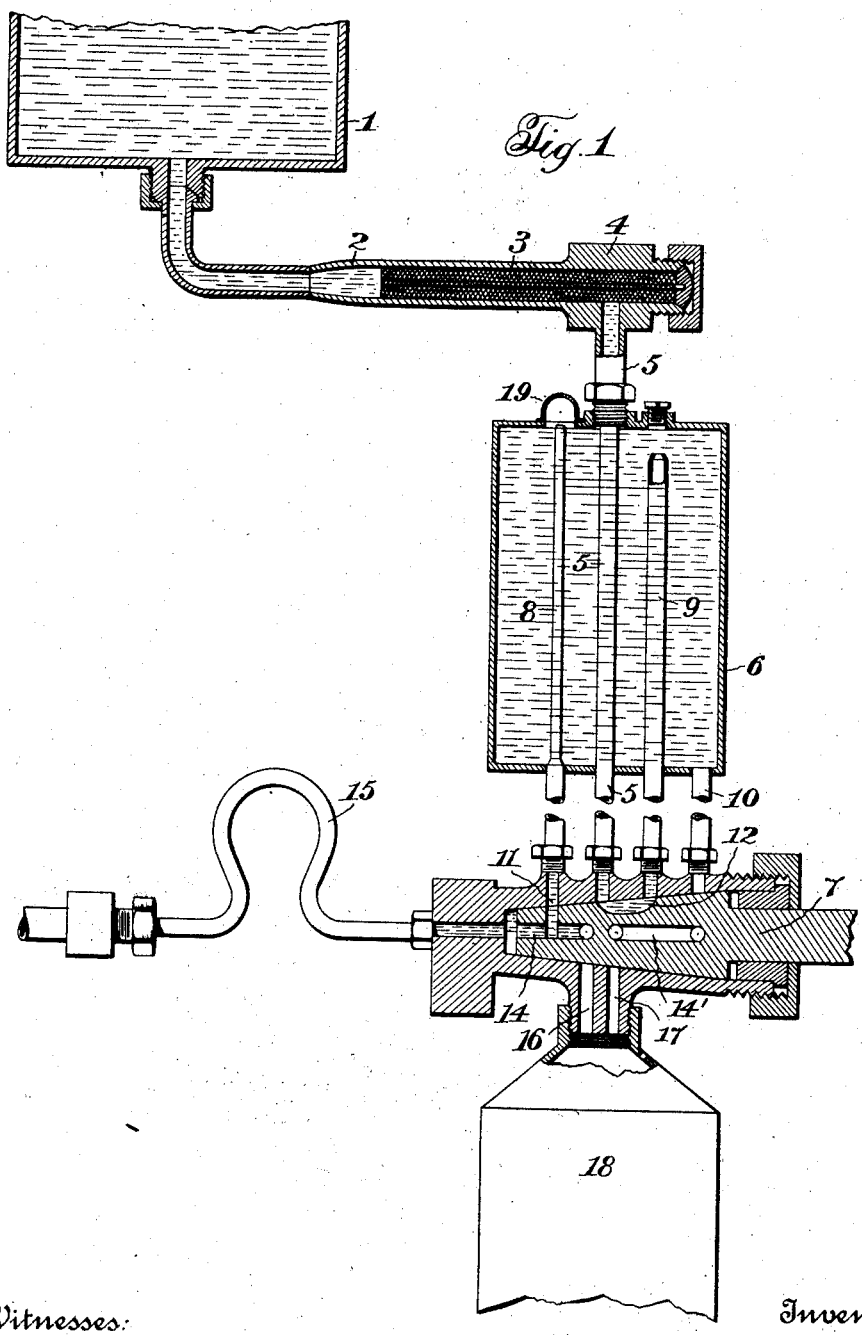
Figure 2:
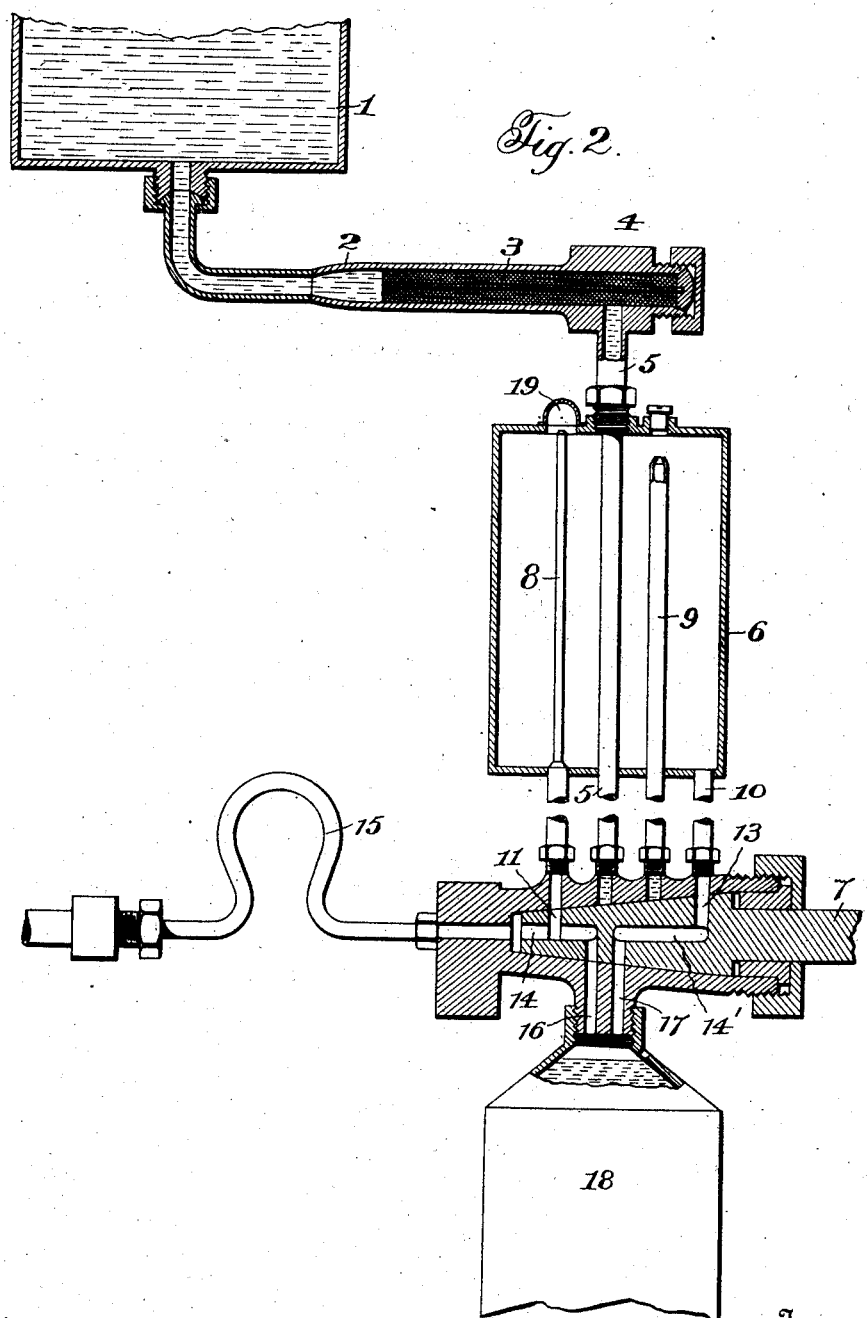

In the accompanying drawing, Figure 1 represents a vertical section of the device showing communication established between burner supply conduit and the reservoir. Fig. 2 is a similar section showing such communication cut off.

The liquid combustible flows from reservoir 1, into a conduit 2, which contains a suitable filter 3, for detaining foreign bodies and admixtures, contained in the liquid combustible. A conduit 5, communicates with the conduit 2 through a coupling 4 and leads to a casing containing a cock 7. When the cock is in the position shown in Fig. 1, the conduit 5 communicates with a filling tube 9, through a curvilinear slot 12 in the cock. This tube 9 enters a closed tank 6 through its bottom and terminates with a narrow opening near the top of the tank. A discharge tube 8 mounted in the tank 6 has its upper or receiving end opening above the discharge end of the tube 9. The lower or discharge end of tube 8 is in constant communication with a conduit 15, which supplies the vaporizer (not shown) by means of segmental passage 11, and passage 14 in the plug 7.

When the cock is in the position shown in Fig. 2, communication between the reservoir and the burner-supply conduit 15, is cut off and the liquid combustible in tank 6 will flow therefrom into a catch tank 18 which communicates with the tank 6 through pipe 10, and passages 13 and 14' and 17 in the cock and communication between this catch-tank and the burner-supply conduit 15 is established through passage 16 which now communicates with passage 14 of the cock.

The operation of the device for the automatic kindling of incandescent lamps is as follows: As is well known alcohol is placed in a cup under the vaporizing tube and ignited for the purpose of heating the tube. The cock 7 is at once opened, as shown in Fig. 1, when the liquid combustible will flow from the reservoir through conduit 5 into tube 9 and raising in the latter flows through the upper narrow opening into tank 6 and owing to the pressure from the reservoir the tank will become filled. By this time the burner will be sufficiently heated to vaporize the liquid combustible which will now flow into the pipe 8 and through the conduit 15 to the vaporizing tube and the incandescent mantle will be ignited by the remaining flame in the cup. Upon turning the cock into the position shown in Fig. 2, the lamp is immediately extinguished by the flow of liquid from the tank 6 as previously described, which causes a suction at the inlet end of tube 8 which withdraws the liquid combustible out of the tube. This suction is aided by a dome 19 placed in the top of the tank directly above the tube.

I claim:

In a device for the automatic kindling of incandescent lamps, the combination with a reservoir for a liquid combustible and a burner conduit, of a closed tank, a supply conduit communicating with the reservoir, a supply tube leading into the tank, a casing connected to the supply conduit and tube, a discharge tube communicating with the burner conduit and tank, a drain in the latter, a cock in the casing to simultaneously connect the supply tube and supply conduit and close the drain and to simultaneously disconnect said tube and conduit and open the drain.

In testimony whereof, I have signed my name to this specification in the presence of two subscribing witnesses.

JOSEPH DANISCHEVSKI.

Witnesses:
H. A. LOVIAGUINE,
EDWARD WANSCHEIDT.